(12) United States Patent
Post et al.

(10) Patent No.: US 8,589,766 B2
(45) Date of Patent: Nov. 19, 2013

(54) CODEWORD REMAPPING SCHEMES FOR NON-VOLATILE MEMORIES

(75) Inventors: Daniel J. Post, Campbell, CA (US); Kenneth Herman, San Jose, CA (US)

(73) Assignee: Apple Inc., Cupertino, CA (US)

( * ) Notice: Subject to any disclaimer, the term of this patent is extended or adjusted under 35 U.S.C. 154(b) by 565 days.

(21) Appl. No.: 12/711,418

(22) Filed: Feb. 24, 2010

(65) Prior Publication Data
US 2011/0209028 A1    Aug. 25, 2011

(51) Int. Cl.
*G11C 29/00*    (2006.01)

(52) U.S. Cl.
USPC ............. 714/766; 714/763; 714/758; 714/54; 365/185.03; 365/185.13; 711/103

(58) Field of Classification Search
None
See application file for complete search history.

(56) References Cited

U.S. PATENT DOCUMENTS

| | | | | |
|---|---|---|---|---|
| 5,859,858 A * | 1/1999 | Leeman | ........................ | 714/721 |
| 7,877,665 B2 * | 1/2011 | Mokhlesi | ..................... | 714/763 |
| 8,046,528 B2 * | 10/2011 | Chu et al. | ...................... | 711/103 |
| 8,122,322 B2 * | 2/2012 | Miller | ........................... | 714/766 |
| 2007/0260817 A1 * | 11/2007 | Ha | .................................. | 711/118 |
| 2009/0019321 A1 * | 1/2009 | Radke | ............................. | 714/54 |
| 2009/0019340 A1 * | 1/2009 | Radke et al. | .................. | 714/763 |
| 2010/0262889 A1 * | 10/2010 | Bains | ............................. | 714/758 |
| 2010/0262890 A1 * | 10/2010 | Radke | ........................... | 714/763 |
| 2011/0093766 A1 * | 4/2011 | Murray et al. | ................. | 714/773 |
| 2011/0119562 A1 * | 5/2011 | Steiner et al. | ................. | 714/766 |
| 2011/0126080 A1 * | 5/2011 | Wan et al. | ..................... | 714/763 |
| 2011/0222344 A1 * | 9/2011 | Abraham | ................. | 365/185.03 |
| 2012/0106249 A1 * | 5/2012 | Roohparvar et al. | .... | 365/185.03 |

* cited by examiner

*Primary Examiner* — John Trimmings
(74) *Attorney, Agent, or Firm* — Van Court & Aldridge LLP

(57) ABSTRACT

Systems and methods are disclosed for remapping codewords for storage in a non-volatile memory, such as flash memory. In some embodiments, a controller that manages the non-volatile memory may prepare codeword using a suitable error correcting code. The controller can store a first portion of the codeword in a lower page of the non-volatile memory may store a second portion of the codeword in an upper page of the non-volatile memory. Because upper and lower pages may have different resiliencies to error-causing phenomena, remapping codewords in this manner may even out the bit error rates of the codewords (which would otherwise have a more bimodal distribution).

32 Claims, 9 Drawing Sheets

CODEWORD REMAPPING SCHEMES FOR NON-VOLATILE MEMORIES

FIELD OF THE INVENTION

This can relate to remapping of codewords for storage in non-volatile memories, such as NAND flash memory.

BACKGROUND OF THE DISCLOSURE

NAND flash memory, as well as other types of non-volatile memories ("NVMs"), are commonly used for mass storage. For example, consumer electronics such as portable media players or cellular telephones often include raw flash memory or a flash card to store music, videos, and other media.

With the continuing demand for higher-capacity, but smaller-sized non-volatile memory devices, the storage density in such non-volatile memories have been increasing. For example, non-volatile memories have been developed that include memory cells that can each store multiple bits of information. Such memory cells are typically referred to as "multi-level cells" ("MLC"), while memory cells that can each store one bit of information are typically referred to as "single-level cells" ("SLC"). A memory cell may be formed from a transistor with a floating gate, and data may be stored in a single-level cell by selectively storing charge in the floating gate. This way, the threshold voltage of the transistor may be altered. Data may be stored in a multi-level cell, on the other hand, by storing different amounts of charge in the floating gate.

Memory cells, whether MLC or SLC, may suffer from error-causing phenomena, such as read disturb and leakage effects, which can affect the device's bit error rate ("BER"). Multi-level cells may be more susceptible to such error-causing phenomena because of the increased resolution needed to store a greater amount of data per memory cell. To maintain high data integrity, error correcting and detecting codes may be applied to data that is stored in non-volatile memories.

SUMMARY OF THE DISCLOSURE

Systems and methods are disclosed for remapping codewords that may be stored in a non-volatile memory (e.g., NAND flash memory). By remapping codewords, the disclosed systems and methods can alter the expected bit error rates for data stored in the non-volatile memory, allowing an error correcting scheme to be designed that may be more efficient and/or effective.

An electronic system may be provided which can include a host, such as a portable media player or a cellular telephone, and a non-volatile memory ("NVM") of any suitable type. For example, the non-volatile memory can include flash memory, such as one or more flash dies. Optionally, the NVM may be packaged with a NVM controller for managing the NVM, and therefore the NVM may be a managed NVM (e.g., managed NAND) or a raw NVM (e.g., raw NAND). The host may include a host processor for controlling and managing the memory locations of the NVM and the data stored therein. For simplicity, components (e.g., the host processor or the NVM controller) that can manage a non-volatile memory may sometimes be referred to simply as a "controller."

In some embodiments, a controller can prepare data for storage in a non-volatile memory, such as by directing an error correcting code ("ECC") engine to encode the data for storage. The prepared data may be codewords in the codeword space of the ECC employed by the ECC engine. The data prepared for storage may sometimes be referred to as a "virtual page" of data, which could be programmed into a physical page of the non-volatile memory. The controller, however, may be configured to program a virtual page or codeword into multiple physical pages of the non-volatile memory.

Some types of physical pages of a non-volatile memory may have different error characteristics than other types of physical pages. For example, "upper" physical pages and "lower" physical pages of the non-volatile memory may have different bit error rates. The controller may program a portion of a virtual page into a lower page and a remaining portion of the virtual page into an upper page. By programming each virtual page in this manner (instead of programming some virtual pages completely in upper pages and some virtual pages completely in lower pages), the overall bit error rate for virtual pages may be evened out from what would otherwise result in a more bimodal distribution of error rates (i.e., higher bit error rates for upper pages and lower bit error rates for lower pages).

In some scenarios, the controller may not be able to store a virtual page or codeword into consecutively-programmed physical pages of the non-volatile memory. For example, after programming a portion of a virtual page into a lower page, if the NVM is configured to program one or more additional lower pages, the controller may wait on programming another portion of the virtual page so that this portion can be programmed into an upper page. The controller may instead begin programming portions of different virtual pages into the intervening lower pages.

To enable storage of virtual pages into non-consecutive physical pages, the controller may be configured to start an ECC calculation on a first portion of a virtual page, where the first portion may be prepared for programming into a lower page. The controller may then save the state of the ECC calculation until a second portion of the virtual page is ready to be prepared and programmed into an upper page. This way, the ECC engine performing the ECC calculation may be freed to perform ECC calculations for other virtual page portions that may be programmed into any intervening lower physical pages.

In some embodiments, to ensure that virtual pages are programmed into a lower and an upper page, the controller can program the physical pages out of order. That is, instead of programming the physical pages in a sequence recommended by the NVM package's manufacturer, the controller can program the physical pages in an order that alternates between lower and upper pages.

The controller may reconstruct a stored virtual page by reading from the two or more physical pages used to store the virtual page and extracting the appropriate data.

In some embodiments, the controller may employ a codeword remapping scheme for a single-level cell non-volatile memory (which may not have upper and lower pages). For example, the controller may rank the physical pages of a block based on the physical page's expected reliability (e.g., based on bit error rate). The controller may then pair higher-reliability physical pages with lower-reliability physical pages for remapping purposes. Such a remapping scheme may also be used with MLC non-volatile memories, but with additional constraints that may be placed on the programming order.

BRIEF DESCRIPTION OF THE DRAWINGS

The above and other aspects and advantages of the invention will become more apparent upon consideration of the following detailed description, taken in conjunction with accompanying drawings, in which like reference characters refer to like parts throughout, and in which.

DETAILED DESCRIPTION OF THE DISCLOSURE

Figure 1:
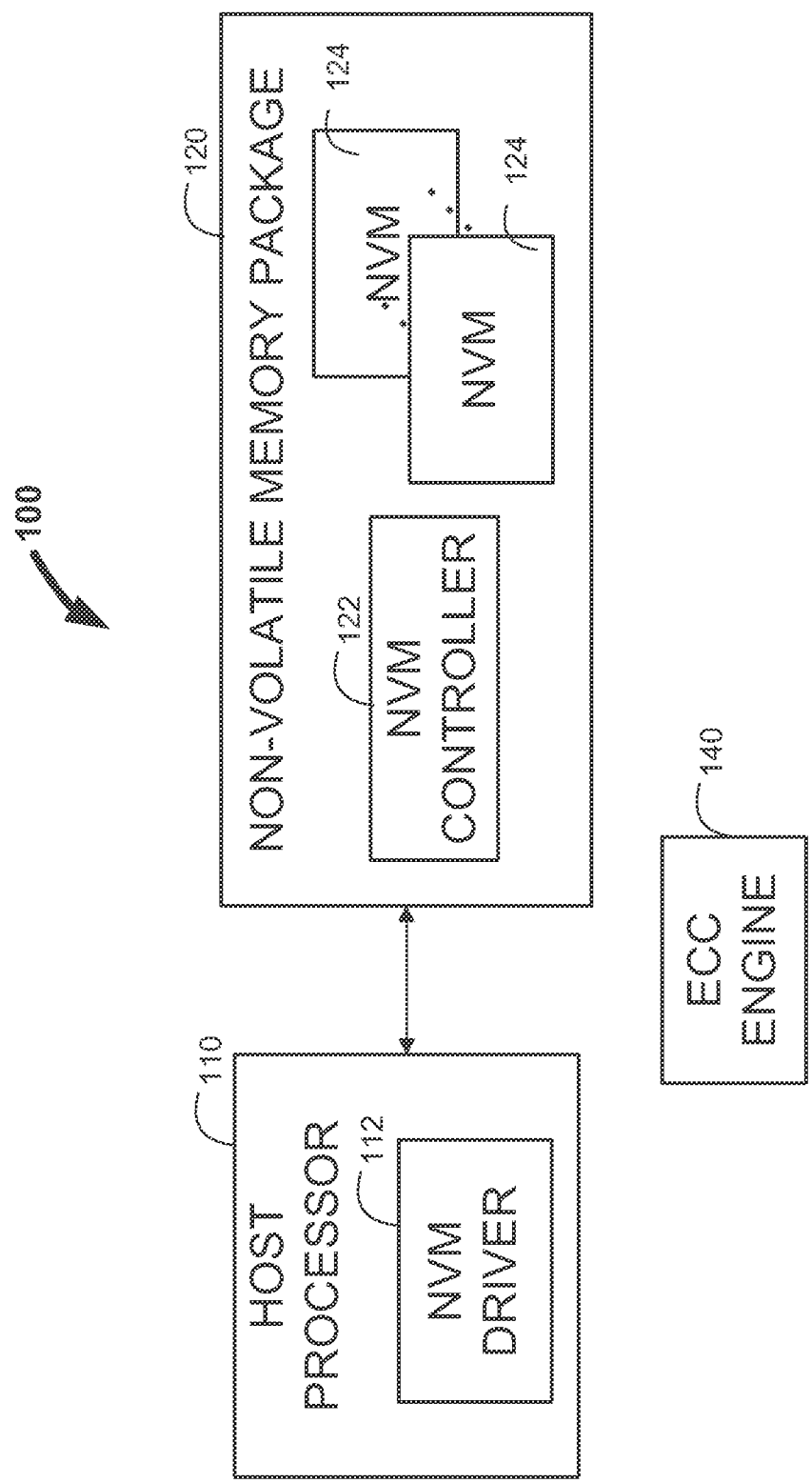
FIG. 1 is a schematic view of an illustrative memory system including a host processor and a non-volatile memory package configured in accordance with various embodiments of the invention.

FIG. 1 is a schematic view of memory system 100. Memory system 100 can include host processor 110, at least one non-volatile memory ("NVM") package 120, and error correction code ("ECC") engine 140. Host processor 110 and optionally NVM package 120 and ECC engine 140 can be implemented in any suitable host device or system, such as a portable media player (e.g., an iPod™ made available by Apple Inc. of Cupertino, Calif.), a cellular telephone (e.g., an iPhone™ made available by Apple Inc.), a pocket-sized personal computer, a personal digital assistance ("PDA"), a desktop computer, or a laptop computer. For simplicity, the host device or system, which may include host processor 110, may sometimes be referred to simplicity as a "host."

Host processor 110 can include one or more processors or microprocessors that are currently available or will be developed in the future. Alternatively or in addition, host processor 110 can include or operate in conjunction with any other components or circuitry capable of controlling various operations of memory system 100 (e.g., application-specific integrated circuits ("ASICs")). In a processor-based implementation, host processor 110 can execute firmware and software programs loaded into a memory (not shown) implemented on the host. The memory can include any suitable type of volatile memory (e.g., cache memory or random access memory ("RAM"), such as double data rate ("DDR") RAM or static RAM ("SRAM")). Host processor 110 can execute NVM driver 112, which may provide vendor-specific and/or technology-specific instructions that enable host processor 110 to perform various memory management and access functions for non-volatile memory package 120.

NVM package 120 may be a ball grid array ("BGA") package or other suitable type of integrated circuit ("IC") package. NVM package 120 may be a managed NVM package or a raw NVM package. In a managed NVM implementation, NVM package 120 can include NVM controller 122 coupled to any suitable number of NVM dies 124. NVM controller 122 may include any suitable combination of processors, microprocessors, or hardware-based components (e.g., ASICs), and may include the same components as or different components from host processor 110. NVM controller 122 may share the responsibility of managing and/or accessing the physical memory locations of NVM dies 124 with NVM driver 112. Alternatively, NVM controller 122 may perform substantially all of the management and access functions for NVM dies 124. Thus, a "managed NVM" may refer to a memory device or package that includes a controller (e.g., NVM controller 122) configured to perform at least one memory management function for a non-volatile memory (e.g., one or more of NVM dies 124).

In a managed NVM implementation, host processor 110 can communicate with NVM controller 122 using any suitable communications protocol, such as a suitable standardized inter-processor protocol. For example, NVM package 120 may be included in a memory card (e.g., flash card), and host processor 110 and NVM controller 122 may communicate using Multimedia Memory Card ("MMC") or Secure Digital ("SD") card interfaces. In other embodiments, NVM package 120 may be included in a Universal Serial Bus ("USB") memory drive, and host processor 110 and/or NVM controller 122 may communicate via a USB protocol.

In some embodiments, non-volatile memory package 120 may be a raw NVM package. In these embodiments, NVM package 120 may not include NVM controller 122, and NVM dies 124 may be managed substantially completely by host processor 110 (e.g., via NVM driver 112). Thus, a "raw NVM" may refer to a memory device or package that may be managed entirely by a host controller or processor (e.g., host processor 110) implemented external to the NVM package.

Host processor 110 and/or NVM controller 122 can each or collectively perform any suitable set of memory management and access functions for NVM dies 124. Such memory management and access functions may include issuing read, write, and erase instructions, performing wear leveling, bad block management, garbage collection, logical-to-physical address mapping, SLC or MLC programming decisions, and recovery operations, applying error correction or detection using ECC engine 140, and data queuing to set up program operations. The memory management and access functions can further include codeword remapping (or virtual page remapping), as discussed in greater detail below.

Memory system 100 can include at least one ECC engine, including ECC engine 140, for protecting the integrity of data stored in NVM dies 124. ECC engine 140 can employ a suitable error correcting code ("ECC") or error detecting code ("EDC"), such as a Reed-Solomon ("RS") code, a Bose, Chaudhuri and Hocquenghem ("BCH") code, a cyclic redundancy check ("CRC") code, or any other suitable error correcting or detecting code. An ECC employed by ECC engine 140 may have any suitable strength. The "strength" of an ECC may indicate the maximum number of errors (e.g., bit flips) that may be corrected by the ECC. ECC engine 140 may be used to protect data that is stored in non-volatile memory dies 124. Therefore, the type and strength of the ECC employed by ECC engine 140 may be selected based on the properties and reliability of NVM dies 124, such as based on the expected bit error rate of the remapped virtual pages of NVM dies 124 (discussed below).

ECC engine 140 may be implemented using any suitable software-based or hardware-based approach. For example, in some embodiments, ECC engine 140 may be software modules executed by host processor 110 or by NVM controller 122. In other embodiments, ECC engine 140 may be implemented using hardware (e.g., an ASIC), such as using one or more linear feedback shift registers ("LFSRs"). The ECC hardware may be included in NVM package 120 for access and use by NVM controller 122. Alternatively, the ECC hardware may be included with and accessed by host processor 110, and ECC engine 140 may be included on the same substrate as host processor 110 (e.g., on a system-on-a-chip ("SOC")). While memory system 100 is depicted as having one ECC engine, it should be understood that more than one ECC engine may be implemented.

NVM dies 124, which may be managed by host processor 110 and/or NVM controller 122, may be used to store information that needs to be retained when memory system 100 is powered down. As used herein, and depending on context, a "non-volatile memory" can refer to NVM dies in which data can be stored, or may refer to a NVM package that includes the NVM dies. NVM dies 124 can include NAND flash memory based on floating gate or charge trapping technology, NOR flash memory, erasable programmable read only memory ("EPROM"), electrically erasable programmable read only memory ("EEPROM"), ferroelectric RAM ("FRAM"), magnetoresistive RAM ("MRAM"), phase change memory ("PCM"), any other known or future types of non-volatile memory technology, or any combination thereof. FIG. 1, as well as later figures and various disclosed embodiments, may sometimes be described in terms of using flash technology. However, this is merely illustrative and not intended to be limiting.

The memory locations in each of NVM dies 124 can be organized into one or more "planes." The different planes can concurrently carry out access operations to its respective memory locations (e.g., program, read, and erase operations). The memory locations of each plane may be organized into "blocks" that may each be erasable at once, with its blocks further organized into "physical pages" that may each be programmable and readable at once. The blocks from corresponding NVM dies 124 (e.g., one block from each NVM die having the same position or block number) may form logical storage units referred to as "super blocks" for use by host processor 110 and/or NVM controller 122. NVM dies 124 may include any suitable number of planes, blocks, and physical pages. For example, in some embodiments, each NVM die 124 may include two planes, where each plane can include 2048 blocks.

Physically, a block in any of NVM devices 124 can include an array of memory cells aligned in rows corresponding to "word lines." The memory cells of a block may be configured as single-level cells ("SLC") or multi-level cells ("MLC"), and each word line in the block may be configured for use in storing one physical page (in the SLC case) or multiple physical pages (in the MLC case). Thus, the number of physical pages in a given block may be based on the number of bits stored per memory cell. A block being used as a 2-bit MLC block may include twice the number of physical pages compared to if the same block were being used as an SLC block. In some embodiments, for example, for a block composed of 64 word lines, the block may include 64 physical pages when used as a SLC block, 128 physical pages when used as a 2-bit MLC block, 192 physical pages when used as a 3-bit MLC block, and so on. These numbers, however, are merely illustrative and a block of NVM dies 124 may include any other suitable number of physical pages. For example, in others embodiments, a word line may be associated with multiple physical pages instead of just one (e.g., for devices that employ even and odd addressing).

Different physical pages of a non-volatile memory may have different error characteristics. That is, different physical pages may have different resiliencies to error and may have different bit error rates. In some cases, the location of a physical page within a block may affect the physical page's error characteristics. The last physical page in a block, for instance, may often have higher error rates than other physical pages in a block.

For MLC embodiments, each of the physical pages stored along the same word line may have different resiliencies to error (e.g., have different bit error rates). For example, for two-bit MLC having two physical pages per word line, the four possible data states of each memory cell in the word line may be "00," "01," "11," and "10," where one of the bits (i.e., the most significant bit) may be associated with one of the physical pages and the other bit (i.e., the least significant bit) may be associated with the other physical page. If, for example, "00" is stored using a threshold voltage level closer to the threshold voltage used for "01" than to "11," less charge disturbance or leakage would be necessary for data stored as "00" to be erroneously read back as "01" than "11." Since an erroneous read-back of "01" (when "00" was stored) would only cause an error in one of the physical pages (i.e., the physical page associated with the most significant bit), the bit error rate of the affected physical page may be higher. The physical page having higher reliability and resiliency to error may be referred to sometimes as a "lower physical page" (or simply "lower page"). The physical page having lower reliability and resiliency to error may sometimes be referred to as an "upper physical page" (or simply "upper page"). Thus, in embodiments with 64 words lines per block, each block may include 64 upper pages and 64 lower pages for a total of 128 total physical pages.

For simplicity, some of the MLC embodiments of the invention may be described below as employing two-bit, four-state MLC. This is merely for clarity in illustrating the features and functionalities of these embodiments. It should be understood that these examples are not intended to be limiting, and that any suitable number of bits per cell may be employed instead (e.g., three-bit MLC, four-bit MLC, and so on). Moreover, the terms "lower page" and "upper page" is not intended to imply that there are only two physical pages in an MLC embodiment—only that there may be at least two physical pages.

Because an upper page may have a different bit error rate than a lower page, information stored in a lower page may have higher reliability than information stored in a higher page (if the error correction scheme employed is the same for both). The inconsistent performance of physical pages may make designing or selecting an appropriate error correcting scheme for ECC engine 140 less efficient or effective. According, systems and methods disclosed herein may perform remapping of information (e.g., codewords of ECC engine 140) to reduce or eliminate the effect of the inconsistent performance of different physical pages (e.g., upper vs. lower physical pages).

Host processor 110 and/or NVM controller 122 may be configured to remap "virtual pages" so that these virtual pages are stored in multiple physical pages (whether MLC or SLC). A "virtual page" of information may refer to a data packet (e.g., a codeword) that is prepared for storage in a non-volatile memory and could be stored in one physical page of the non-volatile memory. A conventional memory system, for example, may be configured to store each virtual page in a different physical page so that the expected error rate of each virtual page depends on which physical page the virtual page is stored. By remapping a virtual page into multiple physical pages having different error characteristics (e.g., into at least one upper page and at least one lower page), the bit error rates of different virtual pages may be evened out. With more consistent bit error rates across virtual pages, an efficient and effective error correcting scheme may be designed for ECC engine 140.

FIGS. 2-5 are graphical representations 200, 300, 400, and 500 of illustrative approaches for remapping virtual pages across multiple physical pages for embodiments in which the non-volatile memory may include multi-level cells. Example remapping schemes for embodiments using single-level cells will be described in greater detail below.

Figure 2:
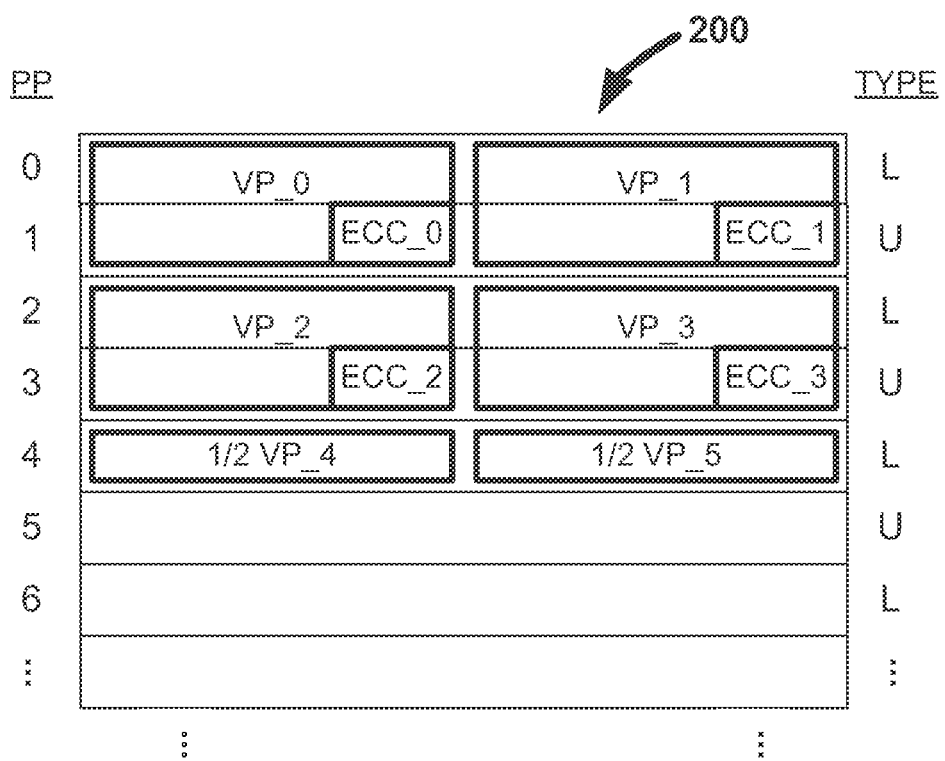
FIGS. 2-5 are graphical representations of virtual pages that are remapped into multiple physical pages of a non-volatile memory in accordance with various embodiments of the invention.
Figure 3:
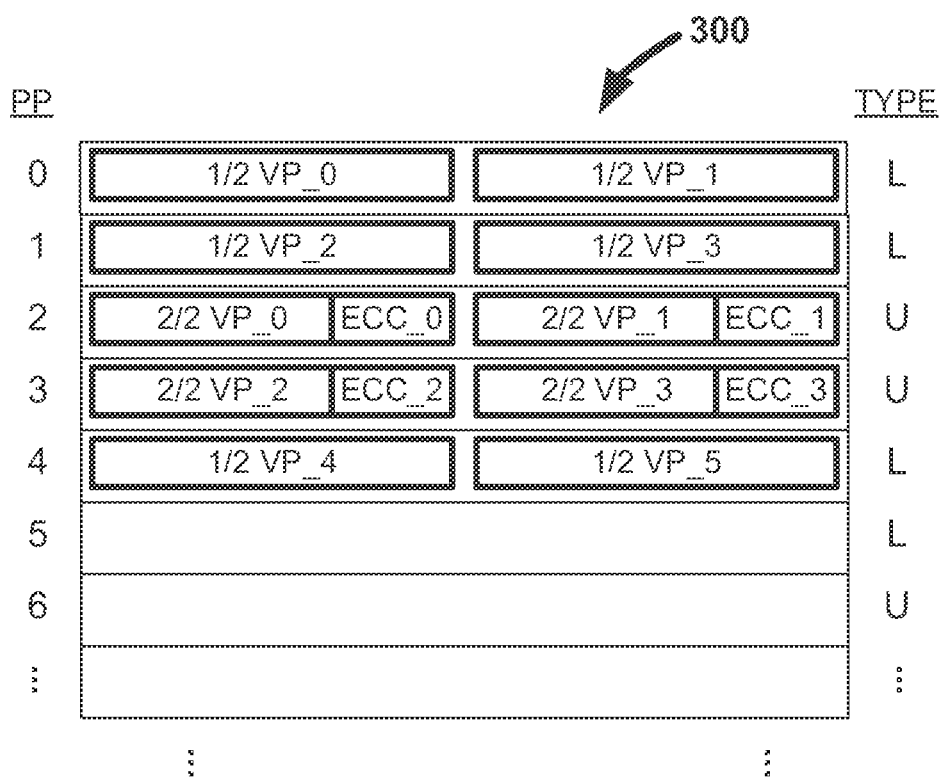
Figure 4:
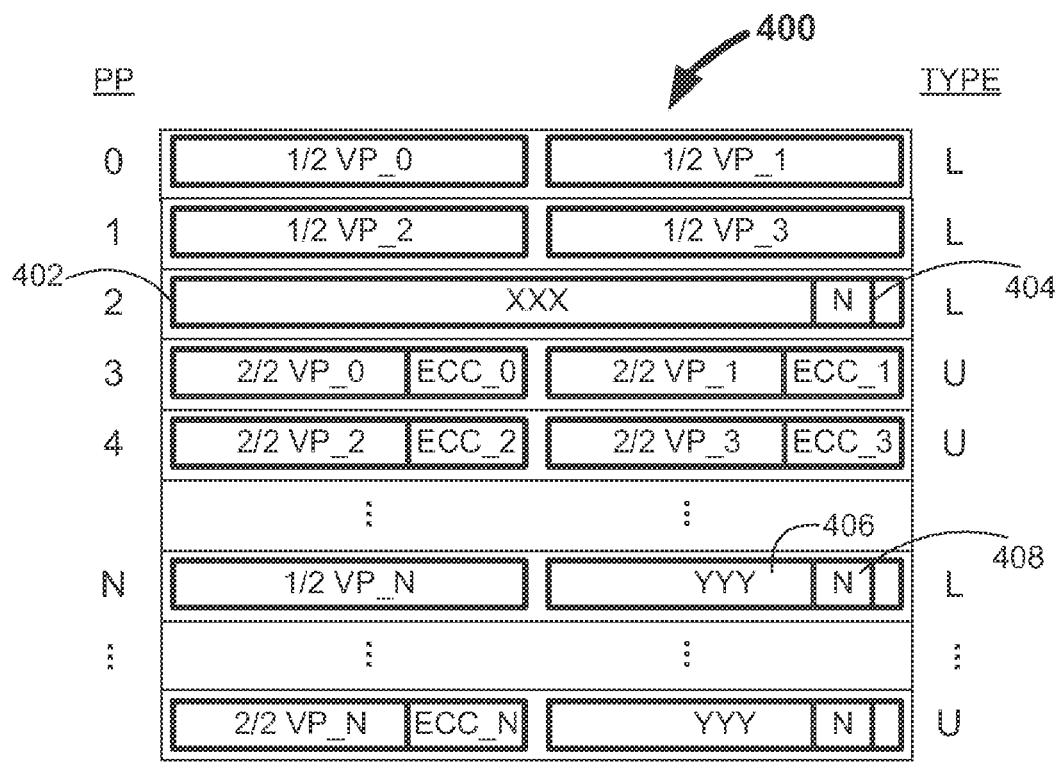
Figure 5:
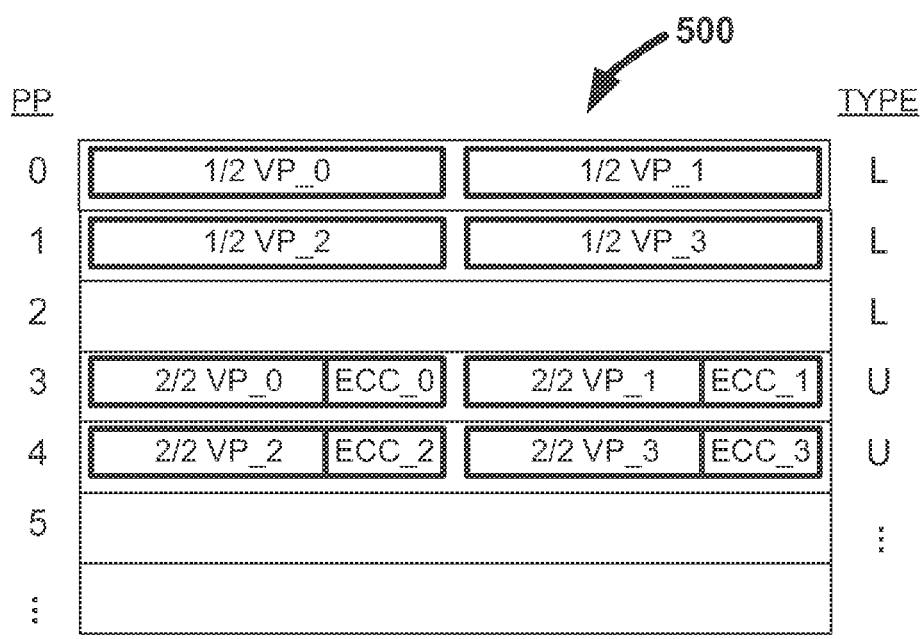

In FIGS. 2-5, each row represents a physical page, and the order of rows illustrates the order of physical pages that are programmed during a sequence of program operations. FIGS. 2 and 3, therefore, each represents the state of a block of a non-volatile memory after five physical pages (i.e., physical pages ("PP") 0, 1, 2, 3, and 4) have been programmed, FIG. 4 represents the state after N physical pages have been programmed (for any suitable integer value of N), and FIG. 5 represents the state after four physical pages have been programmed. On the left of the figures, the "L" and "U" designation next to each row indicates whether the physical page is a lower physical page or an upper physical page.

Referring first to FIG. 2, graphical representation 200 illustrates how virtual pages may be remapped when the physical pages alternate per page between upper pages and lower pages. That is, graphical representation 200 provides an example in which the "page programming order" selected by NVM package 120 (e.g., via NVM controller 122 or other logic) fills the physical pages by programming a lower page, then an upper page, then a lower page, and so on. The "page programming order" may refer to the sequence of word lines in an erased block used to program a sequence of physical pages. Table 1 below gives an example of an illustrative partial page programming order corresponding to the scenario depicted in FIG. 2, although it should be understood that other page programming orders may be used to achieve the scenario depicted in FIG. 2.

TABLE 1

| Word line | Lower Page | Upper Page |
|---|---|---|
| 0 | PP 0 | PP 1 |
| 1 | PP 2 | PP 3 |
| 2 | PP 4 | PP 5 |
| ... | ... | ... |

Host processor 110 and/or NVM controller 122 may be configured to distribute each virtual page amongst at least one upper page and one lower page. For example, a portion of the first virtual page ("VP_0" in FIG. 2) may be programmed into physical page 0 (a lower page), and the remaining portion of the first virtual page may be programmed into physical page 1 (an upper page). The first virtual page of information can include ECC data ("ECC_0"), which may be parity information generated by ECC engine 140 (FIG. 1). This ECC data may be programmed into upper physical page 1.

To fill the remainder of physical pages 0 and 1, host processor 110 and/or NVM controller 122 may also remap the second virtual page (i.e., "VP_1" in FIG. 2) so that the second virtual page is also programmed into both physical pages 0 and 1. For example, the first physical page may be programmed by storing half of VP_0 and half of VP_1, and afterwards, the second physical page may be programmed by storing the remaining half of VP_0 and the remaining half of VP_1. This way, with the data of VP_0 and VP_1 both divided evenly between an upper and a lower page, the overall resiliency (i.e., bit error rates) of both virtual pages 0 and 1 may be approximately the same. This is in contrast to the bimodal bit error rates that may result if VP_0 and VP_1 were each programmed entirely into physical pages 0 and 1, respectively.

Referring now to FIG. 3, graphical representation 300 illustrates one way in which virtual pages may be remapped when the physical pages selected for programming alternate every two (or more) physical pages between upper pages and lower pages. That is, graphical representation 200 provides an example in which the page programming order fills the physical pages by programming two lower pages, then two upper pages, then two lower pages, and so on. Table 2 below gives an example of an illustrative partial page programming order corresponding to the scenario depicted in FIG. 3, although it should be understood that other page programming orders may be used to achieve the scenario depicted in FIG. 3.

TABLE 2

| Word line | Lower Page | Upper Page |
|---|---|---|
| 0 | PP 0 | PP 2 |
| 1 | PP 1 | PP 3 |
| 2 | PP 4 | PP 6 |
| 3 | PP 5 | PP 7 |
| ... | ... | ... |

Because multiple lower pages and multiple upper pages may be programmed in a row, it may not be possible in some scenarios for a virtual page to be programmed into consecutive physical pages. For example, in FIG. 3, since the first portion of the first virtual page (i.e., "1/2 VP_0") is programmed into a lower page and the next physical page is not an upper page, host processor 110 and/or NVM controller 122 may wait on programming the remaining portion of the first virtual page (i.e., "2/2 VP_0") until the next physical page-to-be-programmed is an upper page. Host processor 110 and/or NVM controller 122 may instead program different virtual pages (e.g., portions of virtual pages 2 and 3) into the intervening lower pages. Thus, in this example, portions of virtual pages 0 and 1 may be programmed into the first physical page ("PP_0"), and the remaining portions of virtual pages 0 and 1 may be buffered and then programmed into the third physical page ("PP_2").

In some embodiments, host processor 110 and/or NVM controller 122 may use "non-data pages" to manage the storage of virtual pages. "Non-data pages" may refer to virtual pages that do not include user data—that is, these pages may not include information provided by a file system (for example) and their values may be substantially meaningless to the host. Non-data pages may be used, for example, to manage the flow of storage operations into a non-volatile memory for virtual pages that may not be programmed into non-consecutive physical pages (as in FIG. 3).

Host processor 110 and/or NVM controller 122 may program non-data pages into one or more physical pages in a number of different scenarios. In some embodiments, if multiple lower pages are programmed before any upper pages are programmed, at some point in time, there may be multiple virtual pages that are partially programmed into the non-volatile memory (i.e., into lower pages), but may have their remaining portions still buffered (i.e., in waiting until upper pages are next in the program sequence). If a shutdown command is received at this time, or if any other suitable command is received that indicates that the buffered partial virtual pages need to be committed to a non-volatile memory, host processor 110 and/or NVM controller 122 may program any current lower pages in the sequence with non-data pages. This way, host processor 110 and/or NVM controller 122 can effectively skip to the point in the page programming order where one or more upper pages can be programmed, allowing an opportunity for the buffered partial virtual pages to be committed to the non-volatile memory.

FIG. 4 provides graphical representation 400, which may illustrate the use of non-data pages when the physical pages selected for programming alternate every three physical pages between upper pages and lower pages. In particular, after the first two physical pages ("PP_0" and "PP_1") are programmed with portions of VP_0, VP_1, VP_2, and VP_3, the remaining portions of these virtual pages may be buffered (i.e., waiting to be programmed into upper pages). If a shutdown or other such command is received, host processor 110 and/or NVM controller 122 may program non-data page 402 into the third physical page ("PP_2"), since PP_2 is another lower page. Non-data page 402 can include non-data metadata flag 404 indicating that non-data page 402 does not include any user data and should not be treated in the same way as other virtual pages containing user data.

By effectively skipping over the third physical page ("PP_2"), host processor 110 and/or NVM controller 122 may move onto the fourth and fifth physical pages in the sequence ("PP_3" and "PP_4"), which may be upper pages. Host processor 110 and/or NVM controller 122 may therefore program the remaining portions of VP_0, VP_1, VP_2, and VP_3 into these physical pages, as illustrated in FIG. 4. Because all of the buffered virtual page portions may now be committed to non-volatile memory, memory system 100 may be able to shutdown, hibernate, etc. without losing virtual page data.

Non-data pages may be used to manage storage flow in ways other than in power-down-type scenarios. For example, in some embodiments, host processor 110 (e.g., via NVM driver 112) and/or NVM controller 122 may not receive enough user data from a file system (for example) to begin programming a physical page. This example is illustrated in FIG. 4, where host processor 110 and/or NVM controller 122 may have received a request to store user data for VP_N, but may not have received any further user data to fill out the remainder of the physical page (i.e., PP_N) with another virtual page portion. Instead of waiting to receive more user data, which may or may not occur within a short amount of time, host processor 110 and/or NVM controller 122 can decide to program a portion of non-data page 406 into PP_N with the first portion of VP_N. Like non-data page 402, non-data page 406 can include non-data metadata flag 408 to indicate that non-data page 406 may not include user data.

Host processor 110 and/or NVM controller 122 may decide to use non-data page 408 to fill out physical page PP_N at any time after preparing VP_N. For example, host processor 110 and/or NVM controller 122 may use non-data page 406 after a predetermined amount of time has elapsed without receiving additional user data, in response to receiving a shutdown or flush command, or at any other suitable time or responsive to any other suitable stimulus.

Referring now to FIG. 5, graphical representation 500 illustrates another scheme for remapping virtual pages when the page programming order specifies that multiple lower pages should be programmed in a row. In the example of FIG. 5, host processor 110 and/or NVM controller 122 may be configured to program the physical pages of the non-volatile memory out of order (i.e., not in the page programming order recommended by the manufacturer of the non-volatile memory). Host processor 110 and/or NVM controller 122 may be able to program both portions of a virtual page in consecutive program operations. For example, looking at FIG. 5, host processor 110 and/or NVM controller 122 may program physical pages PP_0 and PP_3 in succession. This way, VP_0 and VP_1 can be fully programmed into the non-volatile memory before host processor 110 and/or NVM controller 122 begins processing another pair of virtual pages. Host processor 110 and/or NVM controller 122 may then program physical pages PP_1 and PP_4 in succession so that VP_2 and VP_3 may be fully programmed into the non-volatile memory.

For some non-volatile memories, such as NAND flash, a lower page may need to be programmed before an upper page on the same word line may be programmed. Otherwise, the data stored in the physical pages of the word line may be corrupted. Thus, host processor 110 and/or NVM controller 122 may use this out-of-order programming scheme illustrated in FIG. 5 in situations where host processor 110 and/or NVM controller 122 may be configured to satisfy this constraint.

It should be understood that the examples of FIGS. 2-5 are merely illustrative and that other approaches to remapping codewords or virtual pages may be used. In some embodiments, each virtual page may be programmed into more than two physical pages. For example, one quarter of a virtual page may be programmed into a first lower page, another quarter may be programmed into a second lower page, another quarter may be programmed into a first upper page, and the remaining quarter may be programmed into a second upper page. This way, each physical page may be used to store information from four different virtual pages.

It should also be understood that the disclosed remapping techniques may be applied for other page programming orders. That is, the remapping techniques may be applied regardless of how upper pages and lower pages are distributed in the sequence of program operations. As long as host processor 110 and/or NVM controller 122 can determine which physical pages are upper pages and which are lower pages, host processor 110 and/or NVM controller 122 can ensure that each virtual page is remapped to be partially programmed into at least one upper page and partially programmed into at least one lower page.

In some embodiments, virtual page remapping schemes may be applied for non-volatile memories having single-level cells. Even with SLC blocks, different physical pages in a block may have different expected error characteristics (e.g., bit error rates) due to their particular locations in a block or for any of a variety of other reasons. To achieve more consistent bit error rates across different physical pages, host processor 110 and/or NVM controller 122 may pair more reliable physical pages with less reliable physical pages and may store each virtual page by dividing the virtual page into paired physical pages. In some embodiments, the error characteristics of different physical pages may be determined from performing tests during the manufacturing phase of the non-volatile memory (or of multiple similarly-constructed non-volatile memories). For example, the tests may include any of the tests discussed in co-pending, commonly-assigned U.S. patent application Ser. No. 12/502,128, filed Jul. 13, 2009 and entitled "TEST PARTITIONING FOR A NON-VOLATILE MEMORY," which is hereby incorporated herein by reference in its entirety.

Physical pages may be paired in a similar manner for MLC embodiments, except that additional conditions may be placed on how the physical pages are paired and the order in which the pairs are programmed. These constraints may ensure that a lower page on a wordline is programmed before the word line's upper page. One example of how host processor 110 and/or NVM controller 122 may pair and sequence the physical pages, effectively creating a new page programming order (which is out-of-order compared to the NVM package's expected page programming order), will be described below in connection with FIG. 11.

While the above-described examples, including the examples of FIG. 2 (with or without Table 1), FIG. 3 (with or without Table 2), FIG. 4, and FIG. 5, illustrate embodiments in which virtual pages are remapped into multiple physical pages in the same block of a non-volatile memory, it should be understood that this is merely illustrative. Remapping in this manner may allow host processor 110 and/or NVM controller 122 to even out the error rates for virtual pages in a block. In some embodiments, host processor 110 and/or NVM controller 122 may instead (or in addition) program each virtual page into physical pages of different blocks, different NVM dies, different NVM packages, etc. This may enable host processor 110 and/or NVM controller 122 to even out the error rates across any suitable group of memory components in memory system 100.

The above-described remapping examples discuss embodiments in which host processor 110 and/or NVM controller 122 ensure that virtual pages are split across upper and lower physical pages (or higher-reliability and lower-reliability physical pages). It should be understood that this is not necessary. In particular, host processor 110 and/or NVM controller 122 may store a virtual page in multiple physical pages without particular regard to the type or reliability of the physical pages used. This way, even though some virtual pages may be stored in multiple upper pages or in multiple lower pages (for example), the distribution of bit error rates across virtual pages may still be evened out compared to if virtual page remapping were not applied at all.

Referring now to FIGS. 6-11, flowcharts of illustrative processes are shown in accordance with various embodiments of the invention. While the processes may be performed by any suitable component, for simplicity and clarity, these processes will be described as being performed by a controller. The controller may be, for example, host processor 110 and/or NVM controller 122 described above in connection with FIG. 1 or any other suitable component.

Figure 6:
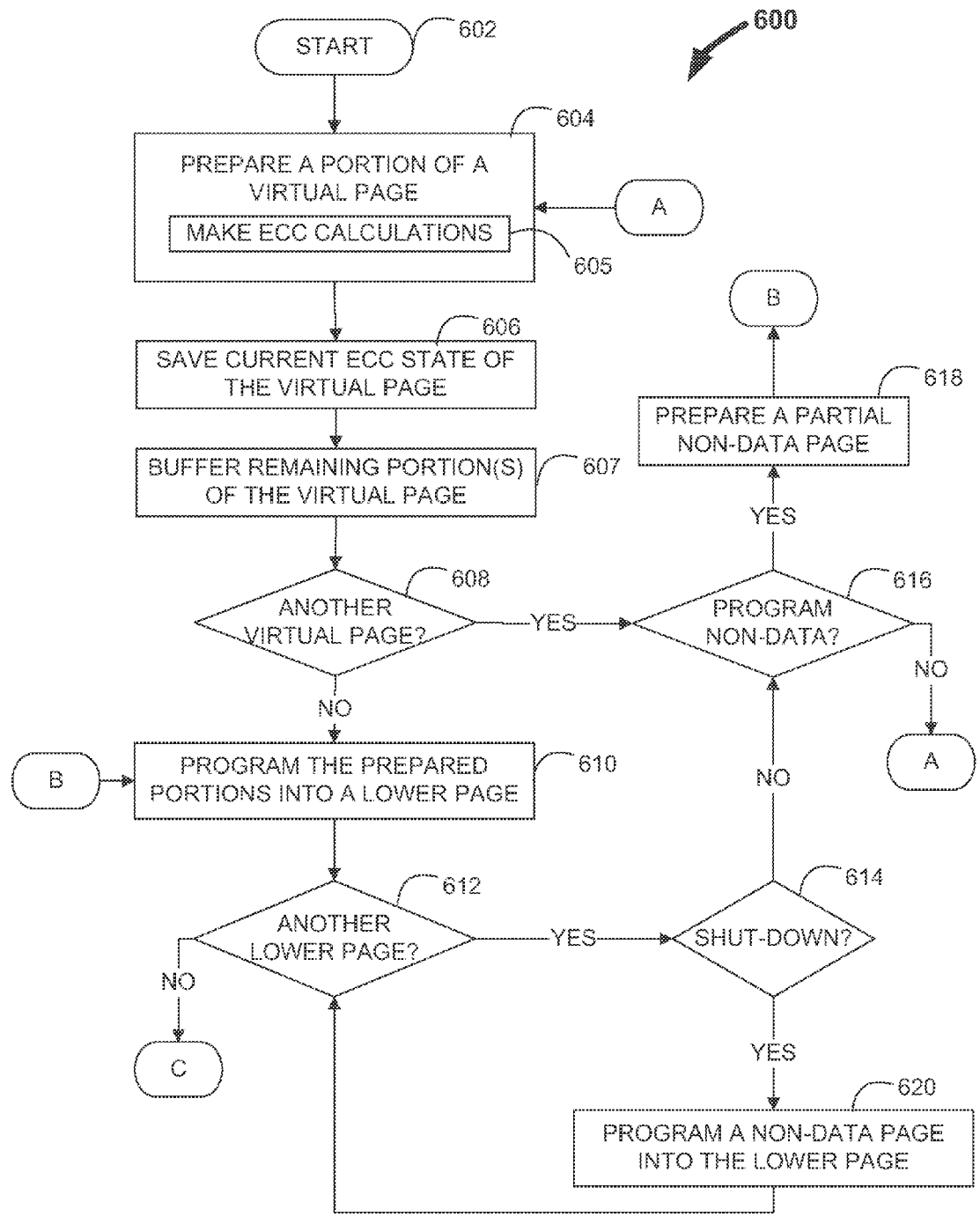
FIGS. 6 and 7 are a flowchart of an illustrative process for remapping virtual pages for storage in a multi-level cell non-volatile memory in accordance with various embodiments of the invention.
Figure 7:
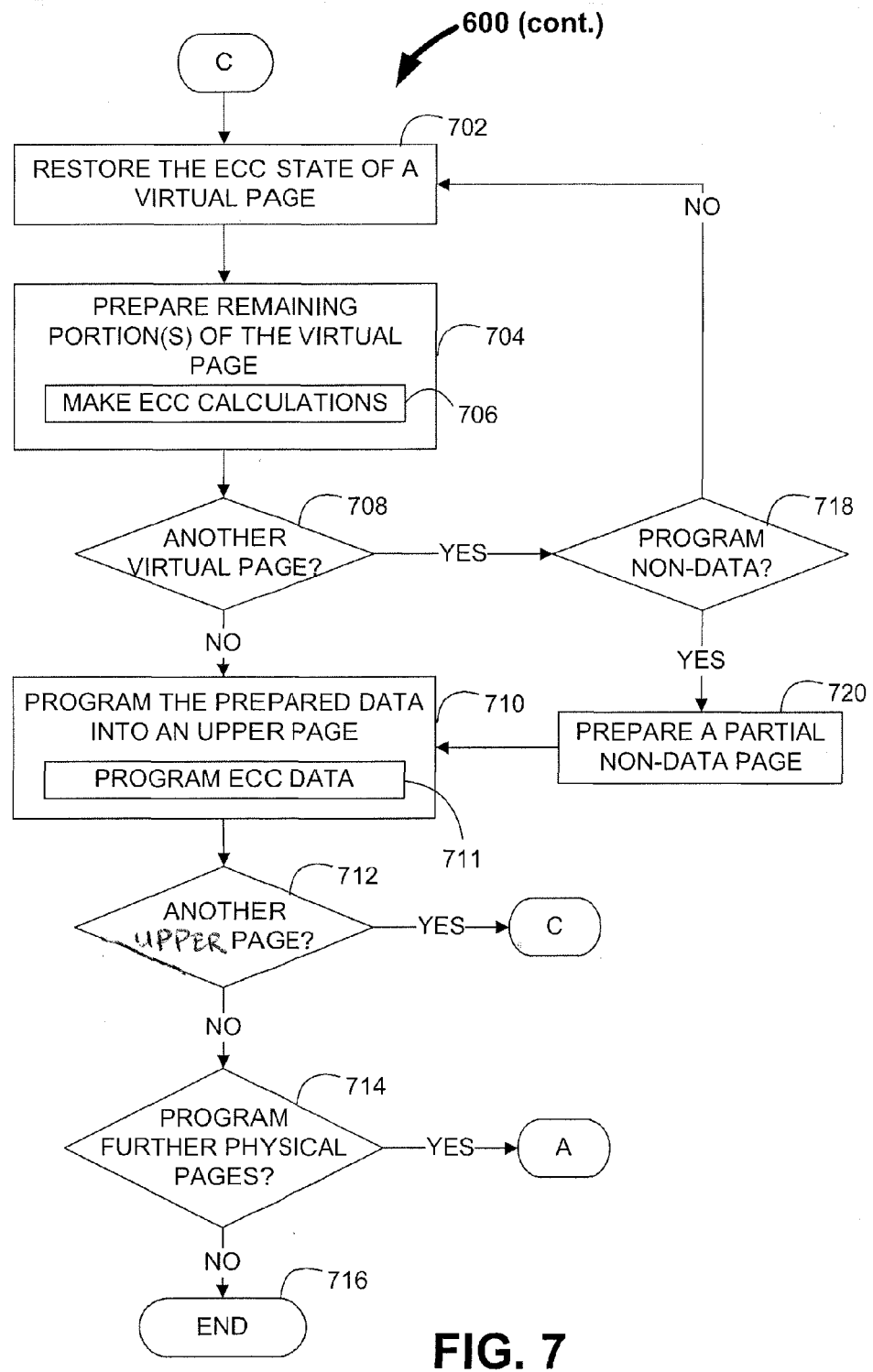

Turning first to FIGS. 6 and 7, a flowchart of illustrative process 600 is shown for remapping a virtual page for storage in a non-volatile memory, such as flash memory. Some of the steps of process 600 may be used, for example, for scenarios similar to that of FIG. 3 in which virtual pages may not be programmed into consecutive physical pages. Thus, process 600 may be described with continued reference to the example of FIG. 3. However, it should be understood that process 600 may be applied to any other suitable scenario.

Process 600 may begin at step 602. At step 604, the controller may prepare a first portion of a virtual page (e.g., 1/2 VP_0 of FIG. 3) for programming into a physical page of a non-volatile memory. This preparation can include step 605 of making ECC calculations to begin forming ECC data for the virtual page, such as ECC_0 of FIG. 3. The ECC calculations may be performed by ECC engine 140 of FIG. 1, for example. Because only a portion of the virtual page may be prepared and provided for programming initially, the ECC calculation at step 605 may not be complete for the entire virtual page. For example, if the ECC engine is implemented using an LFSR, step 605 may involve shifting in some (but not all) of the data necessary to form a codeword into the LFSR, leaving the state of the registers in the LFSR in a partial state of completion. Thus, at step 606, the controller may save the current state of the ECC in a suitable buffer. This way, if the current virtual page will not be programmed into consecutive pages (as in FIG. 3), the controller is free to employ the ECC engine on another virtual page (e.g., on VP_2 of FIG. 3) until preparation of the current virtual page is resumed. For embodiments where each virtual page may be programmed into consecutive physical pages (as in FIG. 2), step 606 may not be necessary and may be omitted from process 600.

Continuing to step 607, the controller may also buffer any user data for any remaining portion(s) of the virtual page, which may be prepared and programmed at a later time. Then, at step 608, the controller may determine whether a portion of another virtual page will be programmed into the same physical page as the first portion of the virtual page. If so, process 600 can continue to step 616. At step 616, the controller can determine whether to fill the remainder of the physical page with non-user data. This determination can be based, for example, on whether user data for another virtual page is received within a predetermined amount of time. If, at step 616, the controller determines that non-user data should be used, process 600 can move to step 618, and the controller can prepare a partial non-data page for programming into the physical page. Process 600 may then continue to step 610, described below.

Returning to step 616, if the controller instead decides not to program non-user data, process 600 can return to step 604. This may allow the controller to prepare a portion of a second virtual page (e.g., 1/2 VP_1 of FIG. 3) for programming with the first virtual page (e.g., 1/2 VP_0 of FIG. 3).

Returning to step 608, if the controller determines that another virtual page portion does not need to be prepared for programming in the same physical page, process 600 can continue to step 610. For the example of FIG. 3, this may occur after the controller has finished preparing portions of VP_0 and VP_1 for programming into the non-volatile memory. Alternatively, process 600 may reach step 610 after preparing non-user data to fill the remainder of a physical page. At step 610, the controller may program the portions of the prepared virtual pages and/or non-user data into a physical page of the non-volatile memory. The physical page may be a lower physical page.

Then, at step 612, the controller may determine whether the next physical page that will be programmed is also a lower page. If so, the remainder of the current virtual pages (e.g., VP_0 and VP_1) may not be programmed yet. Process 600 may continue to step 614, and the controller may determine whether a shutdown command or other suitable command has been received indicating that any buffered virtual pages (e.g., from step 607) should be committed to the non-volatile memory. If such a command is received, the controller may program a non-user data page into the lower page at step 620 so that the buffered virtual pages may be prepared and programmed more quickly.

Returning to step 614, if the controller determines that a shutdown or other similar command has not been received, process 600 may return to step 604. Back at step 604, the controller may begin preparing a portion of another virtual page that is to be programmed into the next, lower physical page (e.g., VP_2 in FIG. 3).

Returning to step 612, if the controller determines that the next physical page is an upper page, the currently buffered virtual pages (e.g., VP_0 and VP_1) may be programmed into the upper page. Process 600 may therefore continue to step 702, shown in FIG. 7.

At step 704, the controller may restore the ECC state of a virtual page (e.g., VP_0 of FIG. 3). At step 704, the controller can prepare the remaining portion of this virtual page for programming into the non-volatile memory. The remaining portion of the virtual page may be prepared using the user data buffered at step 607. The preparation at step 704 can also include making ECC calculations at step 706. That is, the controller may use an ECC engine to continue the ECC calculation from the ECC state restored at step 702. For example, if the ECC engine is implemented as an LFSR, the stored ECC state may be restored to the registers of the LFSR, and step 706 can involve continuing to shift in data into the LFSR. Then, at step 708, the controller can determine whether there is another virtual page portion that should also be programmed into the same physical page as the current virtual page. If so, process 600 can continue to step 718 to determine whether the virtual page portion should be a partial non-data page. This determination may be based on whether the corresponding lower page includes a partial non-user data page.

If, at step 718, the controller determines that non-user data should be programmed, the controller may prepare a partial non-data page for programming into the non-volatile memory. Otherwise, process 700 can return to step 702, and the ECC state of another virtual page, such as VP_1 of FIG. 3, may be restored.

Returning to step 708, if the controller determines that another virtual page portion does not need to be prepared for programming into the same physical page, the controller may be finished preparing portions of virtual pages for programming into a physical page. Process 600 may therefore continue to step 710. At step 710, the controller may program (i.e., commit) the prepared portions into an upper page of the non-volatile memory. Step 710 can involve step 711 of programming the ECC data into the physical page for any virtual pages that are not non-data pages.

Continuing to step 712, the controller may determine whether the next physical page to be programmed is another upper page. If so, process 600 can return to step 702. Otherwise, process 600 can move to step 714, and the controller can decide whether to program further physical pages of the non-volatile memory. If so, process 600 may return to step 604 of FIG. 6. If not, process 600 may end at step 716.

Figure 8:
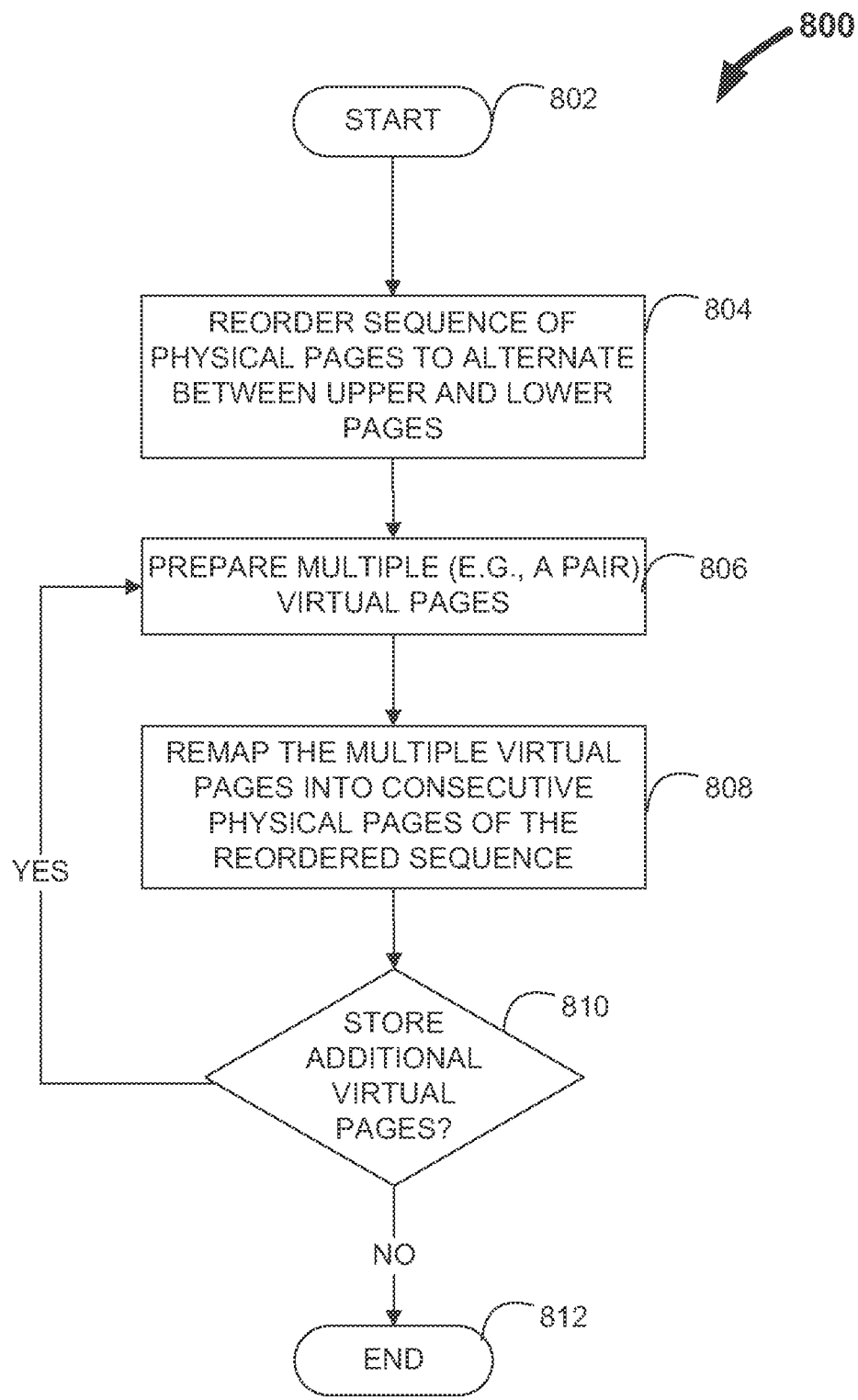
FIG. 8 is a flowchart of an illustrative process for remapping virtual pages into a reordered sequence of physical pages of a multi-level cell non-volatile memory in accordance with various embodiments of the invention.

Referring now to FIG. 8, a flowchart of illustrative process 800 is shown for remapping virtual pages into a reordered sequence of physical pages of an MLC non-volatile memory. Some of the steps of process 800 may be used, for example, to achieve the scenario illustrated in FIG. 5. Thus, process 800 may be described with continued reference to the example of FIG. 5. However, it should be understood that process 800 may be applied to any other suitable scenario.

Process 800 may begin at step 802. At step 804, the controller may reorder the sequence of physical pages so that the reordered sequence alternates per page between lower and upper pages. For the example of FIG. 5, the sequence of physical pages be reordered from PP_0, PP_1, PP_2, PP_3, and so on, to PP_0, PP_3, PP_1, PP_4, and so on. Then, at step 806, the controller can prepare multiple virtual pages for programming into the non-volatile memory. Step 806 can involve, for example, making ECC calculations or preparing non-data pages, as described above.

Process 800 can continue to step 808. At step 808, the controller can remap the virtual pages into consecutive physical pages of the reordered sequence. For the example of FIG. 5, the controller can remap VP_0 and VP_1 into PP_0 and PP_3 (i.e., the first two physical pages in the reordered sequence). Then, at step 810, the controller can determine whether to store additional virtual pages in the non-volatile memory. If so, process 800 can move back to step 806. Otherwise, process 800 can end at step 812.

Figure 9:
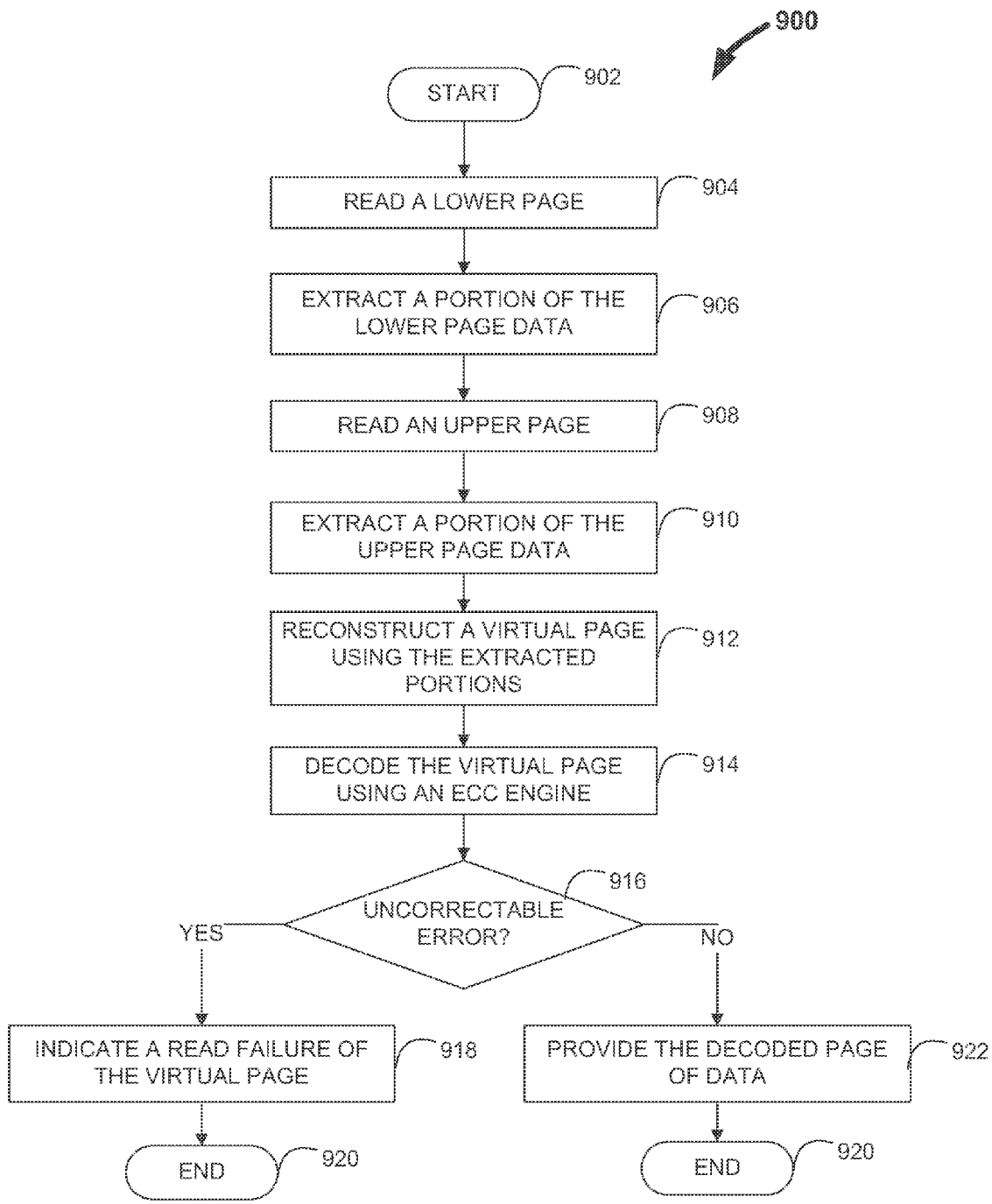
FIG. 9 is a flowchart of an illustrative process for obtaining a virtual page that has been remapped into multiple physical pages of a multi-level cell non-volatile memory in accordance with various embodiments of the invention.

Referring now to FIG. 9, a flowchart of illustrative process 900 is shown for obtaining a virtual page that has been stored in multiple physical pages. Process 900 may be performed in response to a receiving a command from a file system to read data from the non-volatile memory, or process 900 may be performed responsive to any other operation requesting or requiring the data associated with the virtual page.

Process 900 may begin at step 902. Then, at step 904, the controller can read a lower physical page of the non-volatile memory. The lower physical page may include a portion of the virtual page, so at step 906, the controller can extract that portion of the physical page data. Then, at step 908, the controller can read an upper physical page of the non-volatile memory. The upper physical page may include a remaining portion of the virtual page, so at step 910, the controller can extract that portion of the upper physical page data. The remaining portion extracted at step 910 can include ECC data associated with an ECC.

Continuing to step 912, the controller can reconstruct the virtual page using the extracted portions of the lower and upper physical pages. Because the reconstructed virtual page may be a codeword of an ECC, at step 914, the controller may decode the virtual page using an ECC engine employing the ECC. If, a step 916, the controller determines that there is an uncorrectable error, the controller can provide an indication that there was a read failure of the virtual page at step 918. Process 900 may then end at step 920. If, at step 916, the controller instead determines that there is not an uncorrectable error, the controller can provide the decoded virtual page of data at step 922. Process 900 may then end at step 920.

Figure 10:
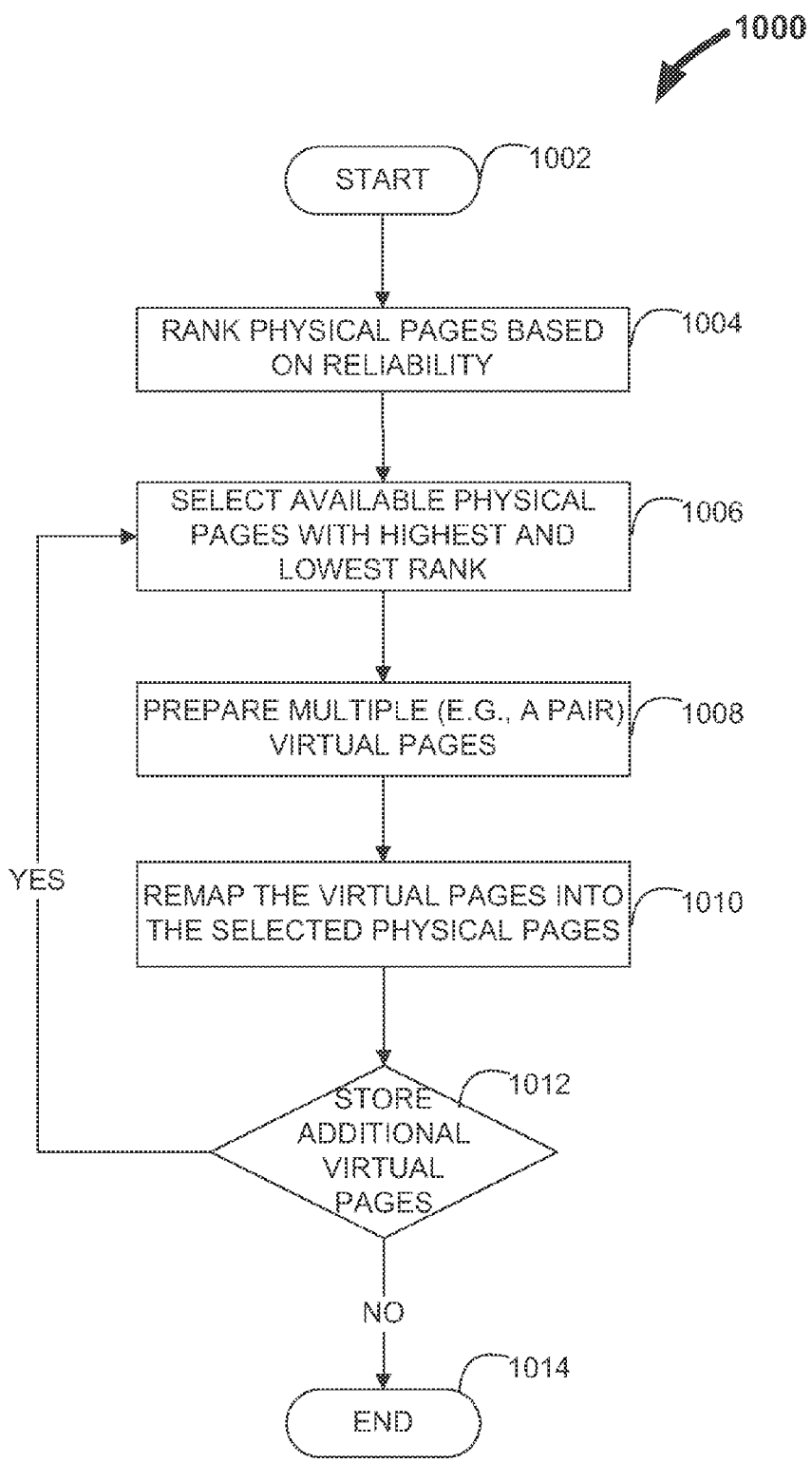
FIG. 10 is a flowchart of an illustrative process for remapping virtual pages for storage in a single-level cell non-volatile memory in accordance with various embodiments of the invention.

Referring now to FIG. 10, a flowchart of illustrative process 1000 is shown for remapping and storing virtual pages into a SLC non-volatile memory by pairing more reliable physical pages with less reliable physical pages. Process 1000 may begin at step 1002. At step 1004, the controller may rank the physical pages (e.g., the physical pages in the same block) based on the expected reliability of the pages. For example, the controller may rank the physical pages based on test results of one or more similar non-volatile memories during their manufacturing phases. Then, at step 1006, the controller may select the physical pages with the highest and the lowest ranks—that is, the selected physical pages may include the most reliable and least reliable physical pages available for programming.

Continuing to step 1008, the controller can prepare multiple virtual pages, such as a pair of virtual pages, for programming into the non-volatile memory. This preparation can include, for example, making ECC calculations. Then, at step 1010, the controller can remap the prepared virtual pages into the physical pages selected at step 1006 for storage into these physical pages. For example, the controller can store a portion of two virtual pages into the most reliable physical page and a remaining portion of the two virtual pages into the least reliable page. This way, the unevenness of the physical page reliabilities may be evened out across the two stored virtual pages.

Moving to step 1012, the controller may determine whether to store additional virtual pages into the non-volatile memory. If so, process 1000 may return to step 1006, and the controller can select the second-most-reliable and the second-least-reliable physical pages as the next two physical pages to program. By pairing physical pages this way, the controller may be able to even out the bit error rates of the virtual pages as much as possible. Returning to step 1012, if the controller determines that no additional virtual pages are to be stored, process 1000 may end at step 1014.

Figure 11:
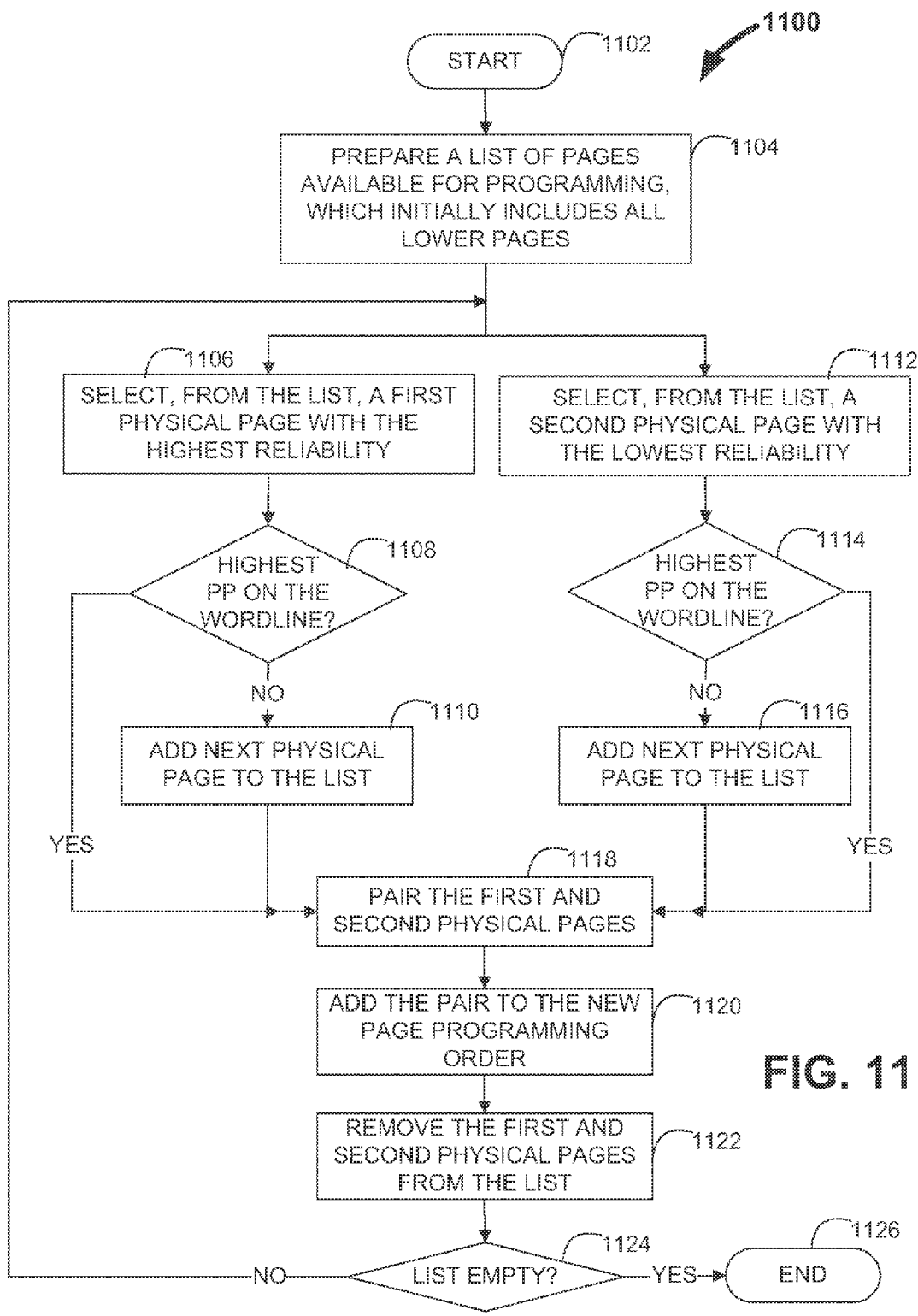
FIG. 11 is a flowchart of an illustrative process for preparing a programming sequence for storing remapped virtual pages in a multi-level cell non-volatile memory in accordance with various embodiments of the invention.

Referring now to FIG. 11, a flowchart of illustrative process 1100 is shown for pairing and ordering physical pages of a MLC non-volatile memory to effectively create a new page programming order for the non-volatile memory. Like process 1000 of FIG. 10, process 1100 may be performed by a controller to pair more reliable physical pages with less reliable physical pages. In fact, as will become apparent below, process 1000 may be viewed as a special, SLC case of process 1100, since SLC embodiments may not include higher-level pages (i.e., upper pages) and may not have some of the programming constraints that are often imposed on MLC blocks. By executing process 1100 of FIG. 11, a new page programming order may be generated and applied instead of the page programming order specified by the NVM package.

Process 1100 may begin at step 1102. At step 1104, the controller may prepare a list of physical pages. The list of physical pages may include those physical pages in a block that are available for pairing and programming. Because upper pages may not be programmed before lower pages, the list of physical pages may initially include only the lower pages of the block.

Process 1100 may then continue to step 1106 and 1112, which are depicted in FIG. 11 as being performed substantially concurrently. It should be understood that, in other embodiments, these steps may not be performed concurrently. In particular, the steps depicted on the left may be performed before or after those depicted on the right.

At step 1106, the controller may select, from the list of available physical pages, the physical page with the highest reliability as one of the next physical pages in the new page programming order. For example, in some embodiments, the controller may rank the physical pages in the list based on reliability, and the controller may select the first physical page in the list. Then, at step 1108, the controller may determine whether the selected first physical page is the highest physical page on the wordline. For example, if the block is 2-bit MLC and the first physical page is a lower page, the first physical page is not the highest physical page. Instead, the upper page on the wordline would be the highest physical page. If, at step 1108, the controller determines that the first physical page is not the highest physical page on the wordline, the next higher physical page on the wordline (e.g., an upper page) is now available for programming. Therefore, at step 1110, the controller may add the next physical page to the list of available physical pages. Otherwise, process 1110 may skip to step 1118, described below.

Note that, should process 1100 be applied for an SLC block, each physical page in the list of available physical pages would be the highest level block on its respective wordline (since there would be no upper pages). Therefore, process 11100 would consistently skip from step 1100 to step 1118, thereby not adding any additional physical pages to the list of available physical pages. Process 1100 would effectively be reduced to process 1000 of FIG. 10, where the controller can make pairing decisions using all of the physical pages of a block at the outset.

Step 1112 through step 1116 may be similar to step 1106 through step 1110 discussed above. In particular, at step 1112, the controller may select a second physical page from the list of available physical pages to be paired with the first physical page. The second physical page, however, may correspond to the least reliable physical page. For example, the controller may rank the physical pages in the list based on reliability, and the controller may choose the lowest ranking physical page as the second physical page. With the second physical page chosen for the new page programming order, the controller may, at steps 1114 and 1106, add a next higher physical page on the same word line as the second physical page to the list (if one is available)

From steps 1108, 1110, 1114, or 1116, process 1100 may continue to step 1118. At step 1118, the controller may pair the first and second physical pages. With the physical pages associated with one another, the controller may (at a later time) be able to remap two or more virtual pages into these paired physical pages. At step 1120, the controller may add the paired first and second physical pages to the new page programming order, and at step 1122, the controller may remove the first and second physical pages from the list of available physical pages. This way, the controller can continue selecting and pairing physical pages that are to be programmed after the first and second physical pages.

In particular, from step 1122, process 1100 may continue to step 1124, and the controller can determine whether there are additional physical pages in the list that still need to be paired and added to the new page programming order. If the list is not empty, process 1100 may return to steps 1106 and 1112 so that additional physical pages may be selected from the list of available physical pages. Otherwise, process 1100 may end at step 1126 with the new page programming order complete.

It should be understood that process 600 (FIGS. 6 and 7), process 800 (FIG. 8), process 900 (FIG. 9), process 1000 (FIG. 10), and process 1100 (FIG. 11) are merely illustrative. Any of the steps in these processes may be removed, modified, or combined, and any additional steps may be added, without departing from the scope of the invention. For example, as illustrated, process 900 of FIG. 9 may be performed when a virtual page is stored in two physical pages only (e.g., one upper page and one lower page). Steps may be added to process 900 for embodiments where a virtual page is stored in more than two physical pages. As another example, while processes 600 and 900 are illustrated with lower pages programmed or read before higher pages, it should be understood that the reverse may be performed instead depending on the constraints of the non-volatile memory. Furthermore, while processes 1000 and 1100 are described for pairing two physical pages, it should be understood that additional physical pages may be selected for embodiments in which virtual pages are remapped into more than two physical pages.

The described embodiments of the invention are presented for the purpose of illustration and not of limitation.

What is claimed is:
1. A memory system, comprising:
   a non-volatile memory comprising a plurality of physical pages;
   at least one error correcting code ("ECC") engine; and
   a controller configured to:
      direct the at least one ECC engine to produce a first codeword from data provided for storage in the non-volatile memory;
      program a first portion of the first codeword in a first physical page of the non-volatile memory;
      program a second portion of the first codeword in a second physical page of the non-volatile memory, wherein the first physical page is a lower physical page and the second physical page is an upper physical page;
      receive a shutdown command after programming the first portion;
      prior to shutting down the memory system, determine that a next physical page in a programming sequence is a second lower physical page; and
      program a non-data page into the second lower physical page.
2. The memory system of claim 1, wherein the non-volatile memory is packaged with the controller.

3. The memory system of claim 1, wherein the non-volatile memory is packaged separately from the controller, and wherein the controller comprises a host processor.

4. The memory system of claim 1, wherein the non-volatile memory comprises multi-level cell ("MLC") flash memory.

5. A memory system, comprising:
a non-volatile memory comprising a plurality of physical pages;
at least one error correcting code ("ECC") engine; and
a controller configured to:
  direct the at least one ECC engine to produce a first codeword from data provided for storage in the non-volatile memory;
  program a first portion of the first codeword in a first physical page of the non-volatile memory;
  program a second portion of the first codeword in a second physical page of the non-volatile memory;
  direct the at least one ECC engine to produce a second codeword from additional data provided for storage in the non-volatile memory;
  program a first portion of the second codeword in the first physical page when programming the first portion of the first codeword; and
  program a second portion of the second codeword in the second physical page when programming the second portion of the first codeword.

6. A memory system, comprising:
a non-volatile memory comprising a plurality of physical pages;
at least one error correcting code ("ECC") engine; and
a controller configured to:
  direct the at least one ECC engine to produce a first codeword from data provided for storage in the non-volatile memory;
  program a first portion of the first codeword in a first physical page of the non-volatile memory;
  program a second portion of the first codeword in a second physical page of the non-volatile memory;
  program a first partial non-data page in the first physical page when programming the first portion of the first codeword; and
  program a second partial non-data page in the second physical page when programming the second portion of the first codeword.

7. A memory system, comprising:
a non-volatile memory comprising a plurality of physical pages;
at least one error correcting code ("ECC") engine; and
a controller configured to:
  direct the at least one ECC engine to
  produce a first codeword from data provided for storage in the non-volatile memory;
  program a first portion of the first codeword in a first physical page of the non-volatile memory;
  program a second portion of the first codeword in a second physical page of the non-volatile memory;
  direct the at least one ECC engine to produce a third codeword;
  program a first portion of the third codeword in a third physical page of the non-volatile memory; and
  program a second portion of the third codeword in a fourth physical page of the non-volatile memory.

8. A method of storing data into multiple locations of a non-volatile memory, the method comprising:
preparing a first portion of a first virtual page for storage in the non-volatile memory, wherein the preparing comprises making an error correcting code ("ECC") calculation using data from the first portion of the first virtual page;
saving a current state of the ECC calculation;
programming the first portion of the first virtual page in the non-volatile memory;
restoring the current state of the ECC calculation;
readying a second portion of the first virtual page for storage in the non-volatile memory, wherein the readying comprises continuing the ECC calculation using data from the second portion of the first virtual page; and
programming the second portion of the first virtual page in the non-volatile memory.

9. The method of claim 8, wherein the programming the first portion of the first virtual page comprises programming the first portion in a first physical page of the non-volatile memory, and wherein the storing programming the second portion of the first virtual page comprises storing programming the second portion in a second physical page of the non-volatile memory.

10. The method of claim 9, wherein the first physical page is a lower page and the second physical page is an upper page.

11. The method of claim 8, wherein the making the ECC calculation is performed using an ECC engine, and wherein the restoring comprises restoring a state of the ECC engine.

12. The method of claim 11, further comprising using the ECC engine for ECC calculations for a second virtual page while the state of the ECC engine for the first virtual page is saved.

13. The method of claim 8, wherein the storing comprises storing ECC data produced from the ECC calculations in the non-volatile memory.

14. Apparatus coupled to a non-volatile memory for managing the non-volatile memory, wherein the non-volatile memory comprises a sequence of physical pages, the apparatus comprising:
an error correcting code ("ECC") engine; and
a controller configured to:
  prepare a plurality of codewords using the ECC engine; and
  program the physical pages in an order different from the sequence, wherein the physical pages are each programmed with portions of at least two of the codewords.

15. The apparatus of claim 14, wherein the controller is further configured to select the order such that the physical pages alternate between lower pages and upper pages.

16. A method of programming virtual pages into physical pages of a non-volatile memory, the method comprising:
ranking the physical pages of the non-volatile memory based on reliability;
selecting a first physical page with the highest rank;
selecting a second physical page with the lowest rank;
storing a first portion of each of the virtual pages in the first physical page; and
storing a second portion of each of the virtual pages in the second physical page.

17. A method of programming virtual pages into physical pages of a non-volatile memory, the method comprising:
ranking the physical pages of the non-volatile memory based on reliability;
selecting a first physical page with the highest rank;
selecting a second physical page with the lowest rank;
storing a first portion of each of the virtual pages in the first physical page;
storing a second portion of each of the virtual pages in the second physical page; and programming additional virtual pages in the non-volatile memory, wherein the programming comprises:
selecting a third physical page with a next highest rank;
selecting a fourth physical page with a next lowest rank;
storing a first portion of each of the additional virtual pages in the third physical page; and
storing a second portion of each of the additional virtual pages in the fourth physical page.

18. A method of creating a page programming order for programming codewords into a non-volatile memory, wherein the page programming order comprises a sequence of pairs of physical pages of the non-volatile memory, the method comprising:
preparing a list of physical pages available for programming; and
performing a plurality of iterations to generate the page programming order, each of the iterations comprising:
selecting, from the list:
a first physical page having the highest expected reliability amongst the physical pages in the list, and
a second physical page having the lowest expected reliability amongst the physical pages in the list;
determining whether there is a third physical page on the same wordline as the first physical page that has not already been included in the page programming order; and
responsive to an affirmation determination, inserting the third physical page to the list; and
adding the first and second physical page to the page programming order.

19. The method of claim 18, wherein the iteration further comprises:
determining whether there is a fourth physical page on the same wordline as the second physical page that has not already been added to the page programming order; and
responsive to an affirmative determination, adding the fourth physical page to the list.

20. The method of claim 18, wherein the iteration further comprises removing the first and second physical pages from the list.

21. The method of claim 18, wherein the preparing comprises initially including only lower physical pages into the list, and wherein the third physical page is a higher physical page on the wordline than the first physical page.

22. Apparatus coupled to a non-volatile memory for managing the non-volatile memory, the apparatus comprising:
an error correcting code ("ECC") engine configured to perforin encoding and decoding based on an ECC; and a controller configured to:
prepare a plurality of virtual pages of data using the ECC engine, wherein each of the virtual pages of data is a codeword of the ECC; and
program a plurality of physical pages of the non-volatile memory, wherein:
a first of the physical pages is programmed with portions of a first pair of the virtual pages;
a second of the physical pages is programmed with portions of a second pair of the virtual pages;
a third of the physical pages is programmed with remaining portions of the first pair of the virtual pages; and
a fourth of the physical pages is programmed with remaining portions of the second pair of the virtual pages.

23. The apparatus of claim 22, wherein at least one of the first, second, third, and fourth physical pages is further programmed with portions of at least one additional virtual page.

24. The apparatus of claim 22, wherein the first and third physical pages comprise lower pages, and wherein the second and fourth physical pages comprise upper pages.

25. The apparatus of claim 22, wherein the first and third physical pages comprise upper pages, and wherein the second and fourth physical pages comprise lower pages.

26. The apparatus of claim 22, wherein the controller is further configured to program the first, second, third, and fourth physical pages in succession.

27. The apparatus of claim 22, wherein the controller is further configured to:
program the first and second physical pages in succession;
program at least one other physical page after programming the first and second physical pages; and
program the third and fourth physical pages in succession after programming the at least one other physical page.

28. A method of obtaining a codeword stored in a non-volatile memory, wherein the non-volatile memory comprises a plurality of lower pages and a plurality of upper pages, the method comprising:
reading lower page data from a first lower page of the non-volatile memory;
extracting a portion of the lower page data;
reading upper page data from a first upper page of the non-volatile memory;
extracting a portion of the upper page data; and
reconstructing the codeword by combining the extracted portions of the lower page data and the upper page data.

29. The method of claim 28, wherein the codeword is associated with a particular error correcting code, and wherein the method further comprises decoding the codeword using the particular error correcting code.

30. The method of claim 29, wherein the extracting the portion of the upper page data comprises obtaining ECC data from the upper page data associated with the particular error correcting code.

31. The method of claim 28, wherein the non-volatile memory comprises multi-level cell ("MIC") flash memory, and wherein the first lower page is associated with a lower bit error rate ("BER") than the second bit error rate.

32. A method of obtaining a codeword stored in a non-volatile memory, wherein the non-volatile memory comprises a plurality of lower pages and a plurality of upper pages, the method comprising:
reading lower page data from a first lower page of the non-volatile memory;
extracting a portion of the lower page data;
reading upper page data from a first upper page of the non-volatile memory;
extracting a portion of the upper page data;
reconstructing the codeword using the extracted portions of the lower page data and the upper page data;
reading additional lower page data from a second lower page of the non-volatile memory;
extracting a portion of the additional lower page data;
reading additional upper page data from a second upper page of the non-volatile memory; and
extracting a portion of the additional upper page data, wherein the reconstructing comprises reconstructing the extracted portions from the lower page data, the upper page data, the additional lower page data, and the additional upper page data.

* * * * *

UNITED STATES PATENT AND TRADEMARK OFFICE
CERTIFICATE OF CORRECTION

PATENT NO.        : 8,589,766 B2                                    Page 1 of 1
APPLICATION NO.   : 12/711418
DATED             : November 19, 2013
INVENTOR(S)       : Daniel J. Post et al.

It is certified that error appears in the above-identified patent and that said Letters Patent is hereby corrected as shown below:

In the Claims

In Column 18, Line 17, Claim 9, delete "storing programming" and insert -- programming --, therefor.

In Column 18, Lines 18-19, Claim 9, delete "storing programming" and insert -- programming --, therefor.

In Column 19, Line 49, Claim 22, delete "perforin" and insert -- perform --, therefor.

Signed and Sealed this
Twenty-sixth Day of January, 2016

Michelle K. Lee
*Director of the United States Patent and Trademark Office*